US006550132B1

(12) United States Patent
Tatsumi

(10) Patent No.: US 6,550,132 B1
(45) Date of Patent: Apr. 22, 2003

(54) METHOD OF MAKING AN INK-JET RECORDING HEAD

(75) Inventor: Junji Tatsumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/452,179

(22) Filed: Dec. 2, 1999

(30) Foreign Application Priority Data

Dec. 7, 1998 (JP) .......................................... 10-347018
Nov. 19, 1999 (JP) .......................................... 11-329399

(51) Int. Cl.[7] ............................ H05B 3/00; B23P 17/00
(52) U.S. Cl. ........................................ 29/611; 29/890.1
(58) Field of Search ................................ 29/890.1, 611; 347/45, 46, 47, 48, 49, 50, 61, 62, 64–94; 156/247, 248; 219/121.7, 121.71

(56) References Cited

U.S. PATENT DOCUMENTS 5,758,417 A * 6/1998 Kobaysashi ................ 29/890.1
5,786,832 A * 7/1998 Yamanaka ................... 347/45
5,958,168 A * 9/1999 Liu ............................ 156/230
5,989,378 A * 11/1999 Liu ............................ 156/241
6,103,992 A * 8/2000 Noddin .................. 219/121.71
6,193,360 B1 * 2/2001 Nishiwaki .................... 347/70

* cited by examiner

*Primary Examiner*—Peter Vo
*Assistant Examiner*—Alan M Boswell
(74) *Attorney, Agent, or Firm*—Fitzpatrick, Cella, Harper & Scinto

(57) ABSTRACT

The present invention provides a manufacturing method of an ink-jet recording head which does not form stagnant ink even at a high density and high speed recording and does not bear stagnant ink due to a heat influence during radiation of excima laser beam on ejecting ports(orifice) 706 and due to defects or deposited foreign particles during connecting the orifice 706 with a top board 102.

In order to obtain such recording heads, before fabricating the ejecting ports 706 a by-product removing tape 101 is pasted capable of being peeled off, on eject port forming plate which is fabricated to an orifice plate 102, so as to increase adhesive property between the by-product removing tape and removed portion by the laser beam.

5 Claims, 5 Drawing Sheets

METHOD OF MAKING AN INK-JET RECORDING HEAD

BACKGROUND OF THE INVENTION

1. Field of Invention

The present invention relates to an ink-jet recording head which has an ejecting port forming plate (often referred as orifice plate hereinafter) where ejecting ports are formed, and relates to a manufacturing method of the ink-jet recording head 2. Brief Description of the Related Art Today ultra-violet laser light etc., as one of the typical excimer laser light(beam) etc. are used for fabricating ejecting ports of above-mentioned type of the ink-jet recording head. Orifice fabrications have been done by radiating the excimer laser light on a side which leads to liquid paths, of surfaces of resin film, for example, a member for the orifice plate.

However, in the ink-jet recording head manufactured by the above-mentioned method, the resin film is decomposed by the laser light and part of the decomposed products deposit around ejecting ports on the front side of the orifice plate or on the back side of it, for example, as debris(carbon layer), when the excimer laser light is radiated to remove the resin from the spots where ejecting ports are to be fabricated.

When the ink-jet head is constituted by employing the orifice plate fabricated by the above-mentioned method and various recording tests are executed, a physical property particularly wettablity of the surface of the orifice plate varies according to whether the surface bears such deposits or not.

It is generally said that the surface of the orifice plate is preferably to be smoother or more homogeneous with no stagnant ink. However, in the ink-jet recording head where the orifice fabrication is made, such stagnant ink often exists at portions where above-mentioned deposits exist. Due to the stagnant ink, flying trajectories of liquid droplets are not stable and therefore recordings of good quality can not be performed. When such stagnant ink grows large, ejection of ink droplets becomes impossible and sometimes such stagnation leads to disorders that recordings become impossible. Because of such problems, ultra-sonic cleansing or adhesive tape have been employed as a secondary fabricating process after the radiation of the laser light, to remove deposited carbon layers.

By connecting the orifice plate which bears fabricated ejecting ports in above-mentioned way, with a top board where liquid paths are formed, so as to constitute designed alignment, a desired ink-jet ejecting head is obtained. An example of the head constituted by above-mentioned method is shown in FIG. 8.

In FIG. 8 a numeral character 702 represents a top board (also referred as a top board with trenches) where trenches for liquid paths 704 are formed, 701 represents substrate where electro-thermal conversion modules 703 for generating heat to let ink eject are patterned, 705 represents an orifice plate made from resin sheet and 706 represents ejecting ports formed on the orifice plate 705, respectively.

In the head constituted by above-mentioned conventional procedure where carbon deposits are removed via a secondary fabrication after the laser radiation, since stagnant ink is decreased, above-mentioned problems such as unstable ejection of ink droplets etc. are solved to a certain extent. However, it is necessary to remove deposits more completely without failure, in recording heads where ejecting ports are arrayed densely so as to attain a high-density and high-speed recording. Because in such case even small amount of remaining deposits cause the stagnant ink generation, and influence of such deposits on recordings tends to be more sensitive.

In addition, such stagnant ink is sometimes formed by heat influence from the laser radiation and fabrication defects during connecting process of the orifice plate to the top board or deposition of foreign particles.

SUMMARY OF THE INVEVTION

The present invention is carried out to solve above-mentioned problems. An object of the present invention is to obtain the stagnant ink free and high reliable ink-jet head by removing completely by-products such as carbon deposits etc. generated during the laser fabrication and by preventing the heat influence, defects or foreign particles on the orifice plates, particularly around ejecting ports. Other object of the present invention is to improve printing quality of the ink-jet recordings.

In order to attain the objects mentioned above, the present invention provides the methods from (1) to (7) described hereunder.

(1) In manufacturing method of an ink-jet recording head comprising: a substrate where energy generating elements for ejecting ink are mounted; a top board for forming liquid paths by connecting with portions where the elements mounted; an ejecting port forming plate where ejecting ports for ejecting ink are formed; and a manufacturing method comprising: a process to paste a sheet member which bears an adhesive layer, capable of being peeled off, at least on one of the sides of the ejecting port forming plate; a process to form the ejecting ports by radiating laser light; a process of peeling off the sheet member after the pasting process of the ejecting port forming plate on the substrate.

(2) A manufacturing method of the ink-jet recording head according to (1), wherein the ejecting port forming plate is constituted by a plate member where at least one of the surfaces of the plate bears a water-repellent layer.

(3) A manufacturing method of the ink-jet recording head according to (1), wherein the sheet members, capable of being peeled off, are applied on the back side or the front side of the ejecting port forming plate or both sides of the plate.

(4) A manufacturing method of the ink-jet recording head according to (1), wherein the sheet member, capable of being peeled off, has enough strength to protect the ejecting ports against mechanical deformation.

(5) A manufacturing method of the ink-jet recording head according to (1), wherein the sheet member, capable of being peeled off has a property to protect the eject ports against thermal influence.

(6) A manufacturing method of the ink-jet recording head according to (1), wherein the sheet member, capable of being peeled off, bears adhesive layers so as to trap by-products during the laser fabrication on the adhesive layers.

(7) The ink-jet recording head is manufactured by one of the methods of (1), (2), (3), (4), (5) and (6).

According to the constitution of the above-mentioned present invention, an adhesive property between the by-product removing tape and the ejecting port forming plate is enhanced by applying removable members such as by-product removing tape etc. on the ejecting port forming plate consisting the orifice plate before fabricating orifices, and by-products are trapped completely by the by-product removing tape which is not peeled off even by the laser during the fabrication.

As mentioned above the present invention enables inventors to trap carbon deposit layers formed, for example, by excimer laser beam, by the by-product removing tape, and to remove the deposited carbon layers completely by peeling off the by-product removing tape. Thermal influence, defects and deposited foreign particles etc. on the surface of the orifice plate during the orifice fabrication process are prevented by peeling off the by-product removing tape after the orifice plate is applied on the substrate. Consequently the present invention enables inventors to supply ink-jet recording heads with high reliability, free from stagnant ink generated by the carbon layers, defects or foreign particles etc.

DETAILED DESCRIPTION OF THE PRESENT INVENTION

Hereinafter detailed the preferred embodiments according to the present invention with reference to the drawings from FIG. 1 to FIG. 7. The best modes contemplated by the inventors during carrying out the invention into practice will also be described corresponding to the preferred embodiments.

Embodiment 1

Figure 1:
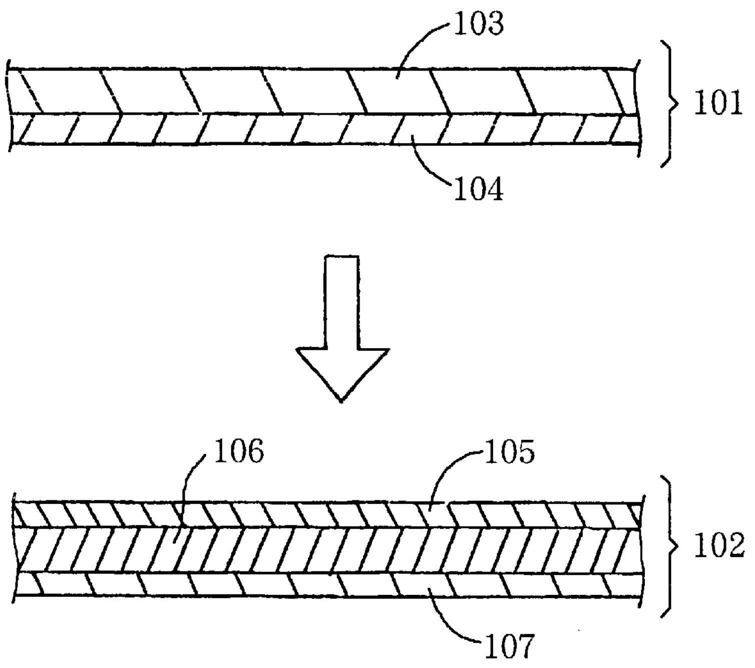
FIG. 1 illustrates an orifice plate of the embodiment 1.

In FIG. 1 an illustration of an orifice plate in the embodiment 1 which explains characteristic features of the present invention is shown. In the figure a numeral character 101 represents a by-product removing tape and 103 represents a sheet member, a base plate for the removing tape 101. In the present embodiment polyethylene terephthalate film (referred to as PET film hereunder) is employed as the sheet member. An adhesive layer 104 which enables the sheet member 103 to be peeled off from the orifice plate, is applied on one side of the PET film 103, thus a by-product removing tape 101 is constituted.

The adhesive layer 104, in the present embodiment for example, is formed by applying 5 micrometer thick acrylic resin adhesive on the PET film 103. An orifice plate 102 is constituted by applying a water-repellent layer 105 on the front surface of 106 representing a plate member which employs polyimide film (referred to as PI film hereunder) used as a base plate for the orifice plate, and applying a contact layer 107 which fixes the orifice plate against the substrate and the top board with trenches, on the back surface of the PI film. The adhesive layer 107 can be applied either before the laser fabrication as the present embodiment, or at any process after the laser fabrication.

The water repellent layer 105 is formed by applying a water repellant "Cytop"(the trade name of the Asahi glass company) on the PI film 106 and then by baking the film 106 at 150° C. for 5.5 hours, while the contact layer 107 is formed by applying 10 micrometer thick acrylic resin adhesive on the other surface of the PI film. After applying the by-product removing tape 101 tightly on the water repellent layer 105 of the orifice plate 102, an excimer laser light is radiated on the plate constituted by the way mentioned above, thus desired eject ports are obtained.

Figure 4:
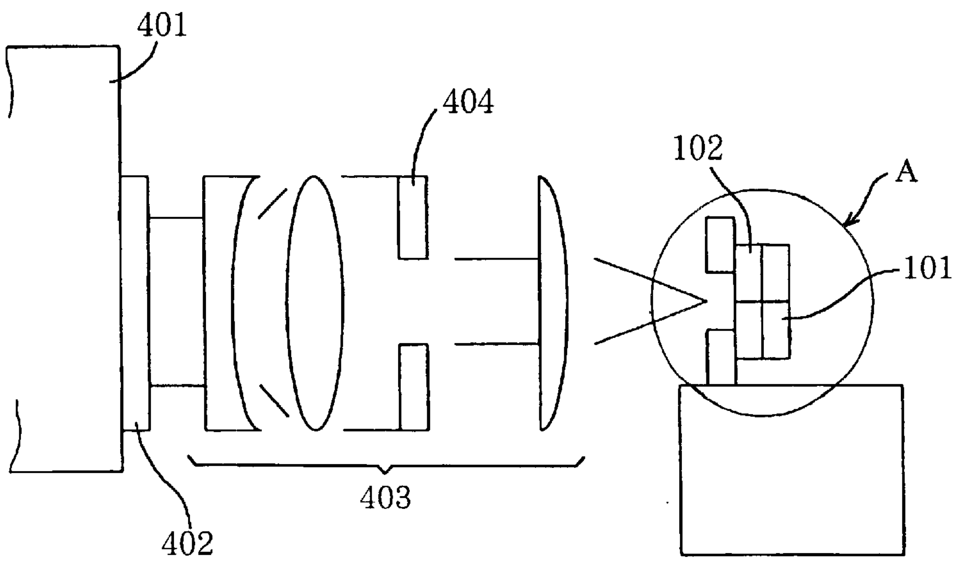
FIG. 4 illustrates fabricating process of the embodiment 1.

FIG. 4 illustrates a status of orifice fabrication by radiating excimer laser light on the orifice plate 102 from the side of the adhesive layer 107. In the FIG. 4 a numeral character 401 represents a KrF excimer laser oscillation apparatus, 402 represents laser light having 248 nm wave length and ca. 15 nsec pulse duration oscillated from the laser oscillation apparatus 401, 403 represents an optical system which accumulates the laser beam 402, and is made from synthesized quartz, and 404 represents an aluminum, deposited on projection mask which is capable of shielding the laser light 402, bearing holes with 100 micrometer in diameter by 170 micrometer pitch. Thus high density (600 dots per inch) ejecting ports are projected on the orifice plate.

Figure 5:
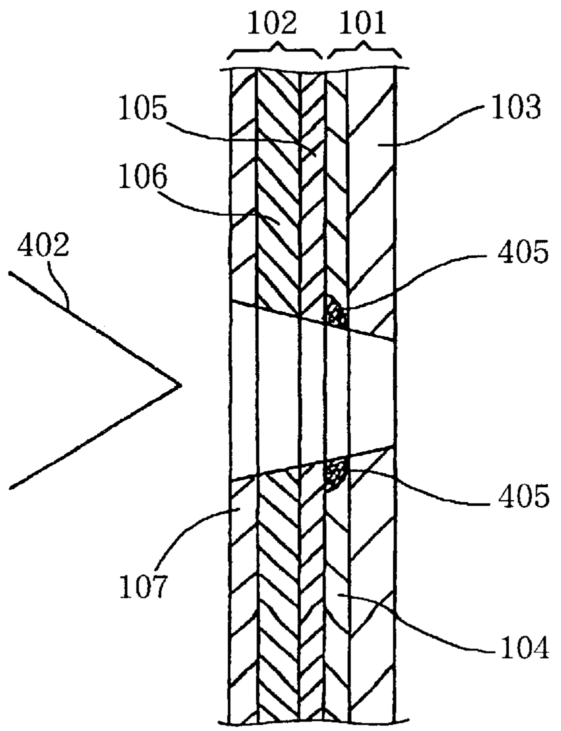
FIG. 5 is an enlarged view of an area enclosed with an open circle designated in by "A" in FIG. 4.

When the laser fabrication is performed as mentioned above, by-products such as carbon etc. are generated. But almost all by-products 405 are trapped on the adhesive layer 104 which constitutes the by-product removing tape as depicted in FIG. 5. And a small portion of by-products, not trapped on the adhesive tape 104, deposit on the surface of sheet member 103. Since by-products which tend to deposit around ejecting ports in the conventional fabrication, remain on the by-product removing tape 101, the by-products 405 can be removed via peeling-off process of the tape 101 from the orifice plate, as explains hereafter.

Figure 6:
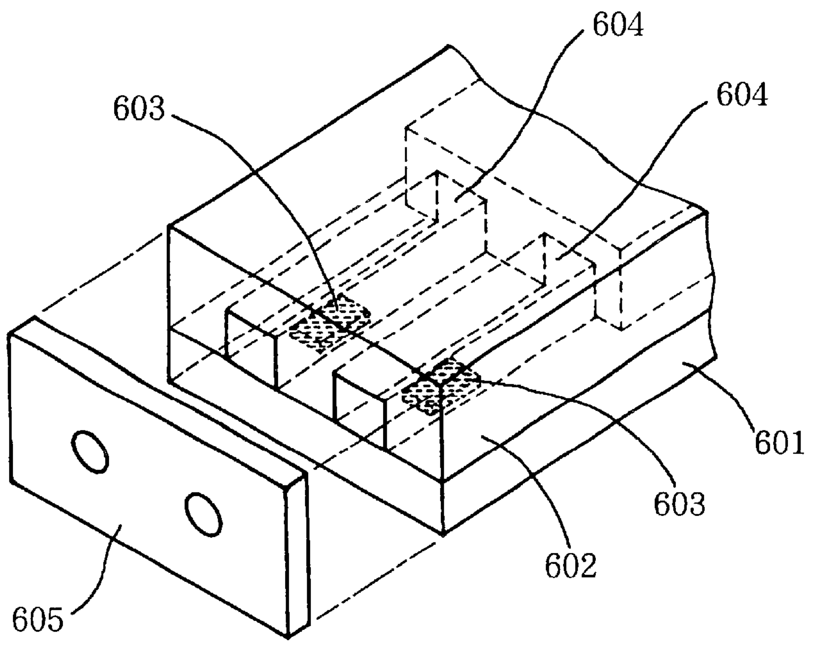
FIG. 6 depicts exploded perspective view of ink-jet recording head according to the embodiments 1, 2 and 3.
Figure 7:
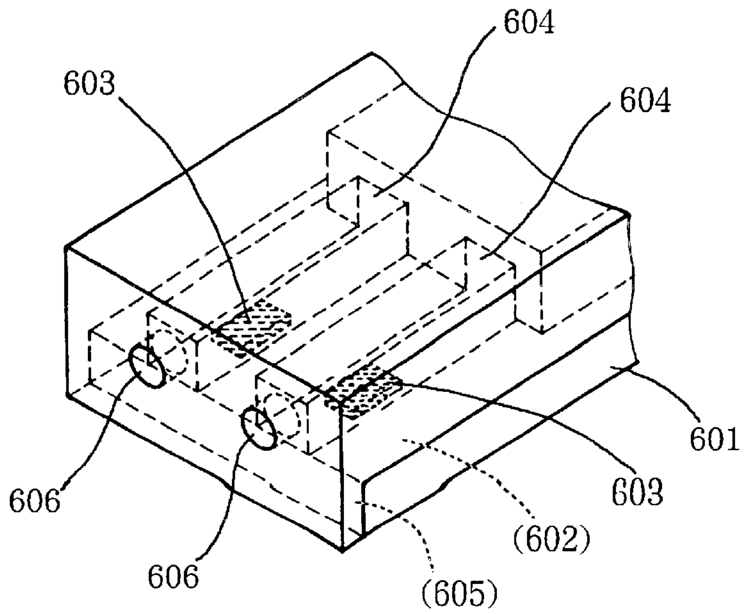
FIG. 7 depicts exploded perspective view of another ink-jet recording head.
Figure 8:
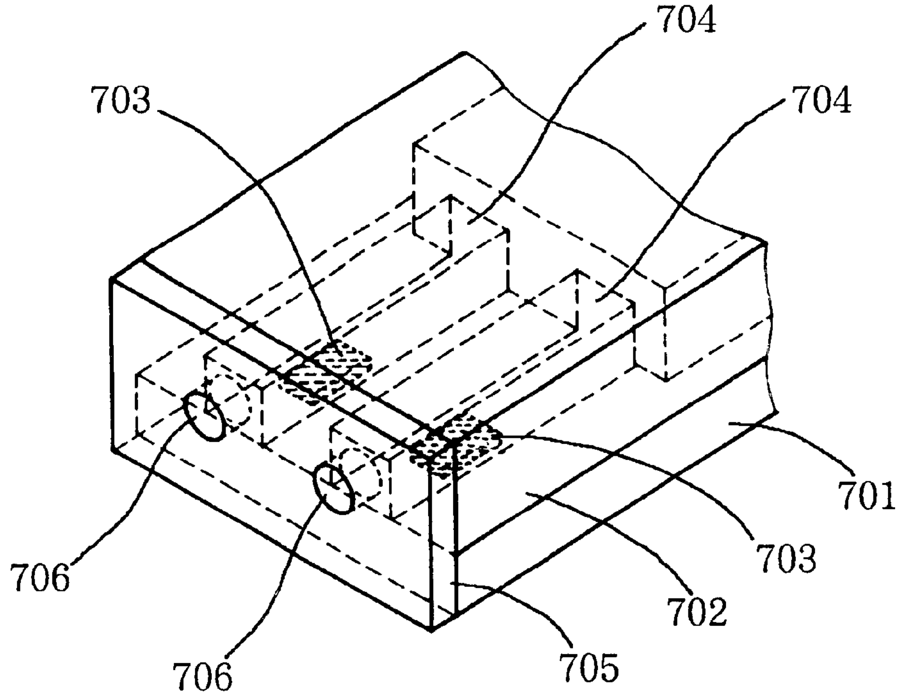
FIG.8 (PRIOR ART)
FIG. 8 depicts a conventional type of an ink-jet recording head.

In FIG. 6, a perspective illustration of the ink-jet recording head where the orifice plate 605 is depicted apart from main portion of the head, which is employed in various embodiments, a numeral character 601 represents substrate constituted of a plurality of electro-thermal conversion modules(ejection heaters) 603 mounted on silicon substrates, and constituted of conductors which supply power to the modules, formed by thin film deposition method of aluminum etc.. 602 represents a top board with trenches which bears walls dividing a plurality of liquid paths 604 and bears a common liquid room which stores ink so as to supply the ink to the liquid paths 604 and the ink is supplied from a (unshown) ink-reservoir.

A main part of the ink-jet head is constituted of the liquid paths 604 on the top board with trenches 602 and eject heater 603 on the substrate 601 are stuck together and pasted at a designed position by a (unshown) spring for pressing.

On the main part of the ink-jet recording head formed according to the above-mentioned procedure, the orifice plate is applied, decided its position and pasted via an adhesive layer 107. Then a desired ink-jet recording head is obtained by peeling off the by-product removing tape 101.

When the surface of the orifice plate 102 formed according to the above-mentioned method is inspected, no deposits removed by the excimer laser light are observed. Also neither defects nor foreign particles on the surface of the orifice plate, anticipated to be formed during positioning or pasting process, are observed, since the by-product removing tape is peeled off after the orifice plate is fixed.

When the ink-jet recording head manufactured by above-mentioned method is mounted on a printer and a status of ejecting ink droplets is observed, any large stagnant ink which is often appeared in conventional ink-jet heads, is not found and flying trajectories of ink are stable. And good printing results are obtained when a high speed (at a cycle of 9.6 kHz) printing is executed.

Embodiment 2

Figure 2:
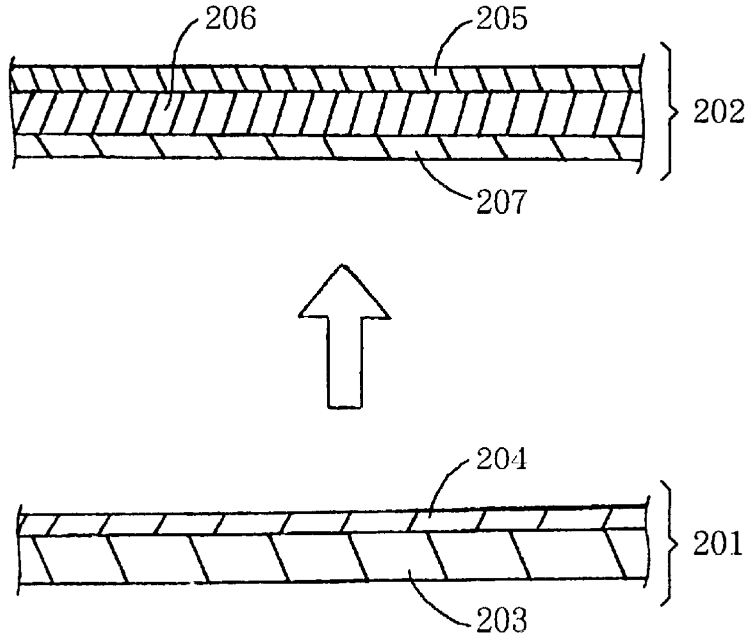
FIG. 2 illustrates an orifice plate of the embodiment 2.

FIG. 2 illustrates embodiment 2 where the present invention is applied. In FIG. 2 a numeral character 201 represents a by-product removing tape and 203 represents a plate member made from poly(ether ether ketone) film(referred to as PEEK film hereunder) which is used as a substrate for the by-product removing tape 201. On one side of the PEEK film 203 an adhesive layer 204 is applied, thus the by-product removing tape 201 is constituted. In this embodiment the adhesive layer 204 is formed by applying 3 micrometer thick rubber adhesive.

An orifice plate 202 is constituted by applying a water-repellent layer 205 on one of the surfaces of 206 which represents a plate member made from polysulfone film (referred to as PSF film hereunder) used as a substrate, and by applying an adhesive layer 207 on the other surface. The water repellent layer 205 is formed by applying a water repellant "Cytop" (the trade name of the Asahi glass company) on the PSF film 206 and then by baking the film 206 at 150° C. for 5.5 hours. While the adhesive layer 207 is formed by applying 10 micrometer thick epoxy resin adhesive on the other surface of the PSF film. After applying the by-product removing tape 201 tightly on the adhesive layer 207 of the orifice plate 202, using the same laser oscillation apparatus as the embodiment 1, an excimer laser light is radiated on the member plate 203 of the by-product removing tape 201, thus desired ejecting ports are obtained.

After peeling off the by-product removing tape 201 formed according to the method mentioned above as shown in the FIG. 2, when the back surface of the orifice plate 202 is inspected, no deposits removed by the excimer laser beam are found and any deformation by the thermal influence around edge of the orifice is not observed either. The by-product removing tape, applied on the back of the orifice plate, functions not only as a remover of the above-mentioned by-products, but also as a protecting member during a cutting process of the orifice plate as a process of the orifice fabrication.

In the FIG. 6 already described above, the numeral character 601 represents the substrate on which a plurality of electro-thermal conversion modules(ejection heaters) 603 mounted on the silicon substrate, and conductors, which supply power to the modules, formed by thin film deposition method of aluminum etc.. 602 represents the top board with trenches which bears walls dividing a plurality of liquid paths 604 and bears a common liquid room which stores ink so as to supply the ink to the liquid paths 604, and the ink is supplied from (unshown) ink-reservoir. A main part of the ink-jet recording head is formed by fastening the liquid paths 604 on the top board 602 and ejecting heater 603 together at a designed position with a pressure from (unshown) a pressing spring.

An ink-jet recording head is obtained by pasting the adhesive layer 207 on the main part formed above-mentioned procedure after deciding the position of the orifice plate.

Embodiment 3

Figure 3:
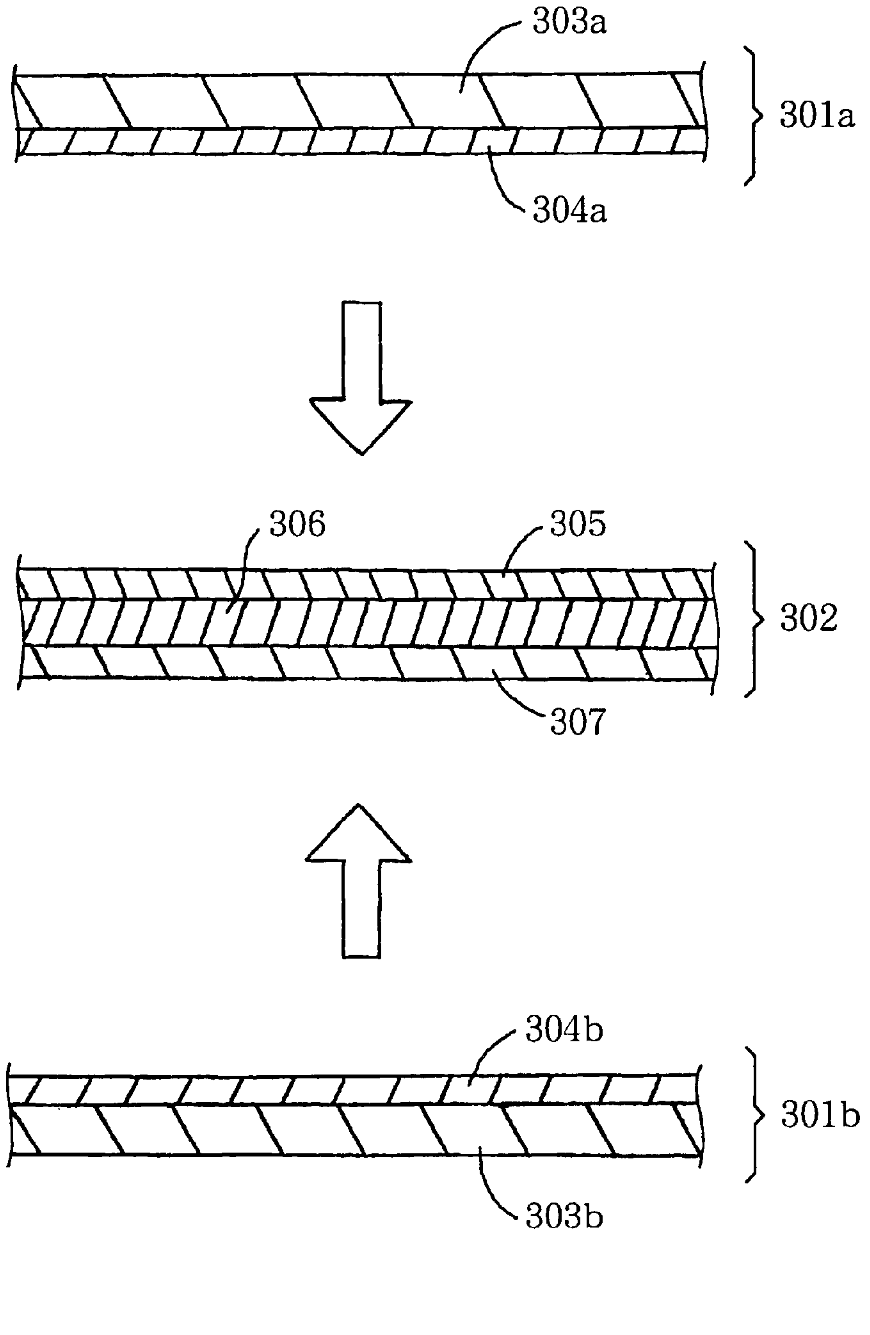
FIG. 3 illustrates an orifice plate of the embodiment 3.

FIG. 3 illustrates embodiment 3 where the present invention is applied. In the FIG. 3 numeral characters 301*a* and *b* represent by-product removing tapes and 303*a* and *b* represent plate members made from poly(ether sulfone) film (referred to as PES film hereunder) which is used as substrates for the by-product removing tapes 301*a* and *b*. On one side of the PES film 303*a* and *b* adhesive layer 304*a* and *b* are applied, thus the by-product removing tapes 301*a* and *b* are constituted respectively. The adhesive layer 304*a* and *b* are formed by applying 3 micrometer thick acrylic resin adhesive.

An orifice plate 302 is constituted by applying a water-repellent layer 305 on one of the surfaces of 306 which represents a plate member made from polysulfone film (PSF film) used as a substrate, and by applying an adhesive layer 307 on the other surface of the PSF film respectively. The water repellent layer 305 ,is formed by applying a water repellant "Cytop"(the trade name of the Asahi glass company) on the PSF film 306 and then baking the film 306 at 150° C. for 5.5 hours. While the adhesive layer 307 is formed by applying 10 micrometer thick epoxy resin adhesive on the other surface of the PSF film.

The by-product removing tape 301*a* is pasted on the water-repellent layer 305 of the orifice plate 302, and other by-product removing tape 301*b* is also pasted on the contact layer 307 pasted on the other side of the orifice plate. After sticking the three layers tightly together by roles, then using the same laser oscillation apparatus as the embodiment 1, an excimer laser light is radiated from the side of the member plate 303 of the by-product removing tape 301*b* which is pasted on the rear side of the orifice plate, thus desired ejecting ports are obtained.

After peeling off the by-product removing tape 301*b* formed according to the above-mentioned method as shown in the FIG. 3, when the back surface of the orifice plate 302 is inspected, no deposits removed by the excimer laser beam are found and any deformation by the thermal influence around edge of the orifice is not observed either.

In the FIG. 6 already described above, the numeral 601 represents the substrate on which a plurality of electro-thermal conversion modules (ejection heaters) 603 mounted on silicon substrates, and conductors which supply power to the modules, formed by thin film deposition method of aluminum etc.. 602 represents the top board with trenches which bears walls dividing a plurality of liquid paths 604 and bears a common liquid room which stores ink so as to supply the ink to the liquid paths 604 and the ink is supplied from (unshown) ink-reservoir. A main part of the ink-jet recording head is formed by fastening liquid paths 604 on the top board 602 and ejection heaters 603 together at a designed position with a pressure from (unshown) a pressing spring.

An ink-jet recording head is obtained by pasting the adhesive layer 307 on the main part formed above-mentioned procedure after deciding the position of the orifice plate, and then the by-product removing tape 301*a* pasted on the orifice plate 302 shown in the FIG. 3 is peeled off.

When the surface of the orifice plate 302 of the ink-jet recording head constituted according to the above-mentioned method is inspected, no deposits removed by the excimer laser light are observed. Also neither defects nor foreign particles which are anticipated to be formed during positioning or pasting process are observed.

When the ink-jet head manufactured by above-mentioned method is mounted on a printer and a status of ejecting ink droplets of ink is observed, any large stagnant ink which is often appeared in conventional ink-jet recording heads, is not found and flying trajectories of ink are stable. And good printing results are obtained when a high speed (at a cycle of 9.6 kHz) printing is performed.

Though in the above-mentioned embodiment 1 to 3 the orifice plate 605 and the top board with trenches 602 are drawn as different constituting parts as examples of embodiments as shown in the FIG. 6, constitutions by the present invention are not restricted in the above mentioned embodiments. For example a constitution shown in FIG. 7, where an orifice plate 605 and a top board with trenches 602 are formed as a single body, is also capable of obtaining the same effects as above-mentioned embodiments.

In addition, it is desirable to endow the adhesive layer on the by-product removing tape with properties; that the layer is not peeled off by the laser fabrication on the orifice plate, that the layer does not peel off the water-repellent layer together when the tape is peeled off and that even a small portion of the layer does not remain on the water repellent layer.

What is claimed is:

1. A manufacturing method of an ink-jet recording head which comprises:

a substrate having energy generating elements for ejecting ink; a top board for forming liquid paths by connecting said substrate; and an ejecting port forming plate having ejecting ports communicating said liquid paths for ejecting ink;

said manufacturing method comprising the steps of:

forming a water repellant layer on a plate member constituting said ejecting port forming plate, masking a peelable sheet member having an adhesive layer, on a surface of said water repellant layer of said plate member, forming openings constituting said ejecting ports on said plate member, said water repellent layer, and said peelable sheet member by irradiating laser light, and peeling off said peelable sheet member from said water-repellant layer and said plate member.

2. The manufacturing method of the ink-jet recording head according to claim 1, wherein said peelable sheet member is applied on a back side, on a front side, or on both sides of said ejecting port forming plate.

3. The manufacturing method of the ink-jet recording head according to claim 1, wherein said peelable sheet member has enough strength to protect said ejecting ports against a mechanical deformation.

4. The manufacturing method of the ink-jet recording head according to claim 1, wherein said peelable sheet member has a property to protect said ejecting ports against thermal influence.

5. The manufacturing method of the ink-jet recording head according to claim 1, wherein said adhesive layer is arranged on said peelable sheet member so as to trap by-products during the irradiating of laser light on said plate member and said peelable member.

* * * * *

UNITED STATES PATENT AND TRADEMARK OFFICE
CERTIFICATE OF CORRECTION

PATENT NO. : 6,550,132 B1
DATED : April 22, 2003
INVENTOR(S) : Junji Tatsumi

It is certified that error appears in the above-identified patent and that said Letters Patent is hereby corrected as shown below:

Title page,
Item [57], ABSTRACT,
Line 5, "ports(orifice)" should read -- ports (orifice) --.

Column 1,
Line 8, "referred" should read -- referred to --.
Line 14, "light" should read -- light, --.
Line 15, "light(beam) etc. are" should read -- light (beam), etc. is --.
Line 25, "debris(carbon" should read -- debris (carbon --.
Line 55, "referred" should read -- referred to --.
Line 62, "constituted by" should read -- constituted by the --.

Ccolumn 2,
Line 3, "such" should read -- such a --.
Line 19, "Other" should read -- Another --.

Column 3,
Line 1, "consisting" should read -- consisting of --.
Line 36, "detailed" should read -- detailed are --.

Column 4,
Line 40, "modules(ejection" should read -- modules (ejection --.

Column 5,
Line 10, "film(referred" should read -- film (referred --.
Line 46, "modules(ejection" should read -- modules (ejection --.
Line 60, "formed" should read -- formed by the --.

UNITED STATES PATENT AND TRADEMARK OFFICE

CERTIFICATE OF CORRECTION

PATENT NO. : 6,550,132 B1 
DATED : April 22, 2003
INVENTOR(S) : Junji Tatsumi

It is certified that error appears in the above-identified patent and that said Letters Patent is hereby corrected as shown below:

Column 6,
Line 4, "film" should read -- films --; and "layer" should read -- layers --.
Line 6, "layer" should read -- layers --.
Line 14, "305 ,is" should read -- 305, is --.
Line 21, "other" should read -- another --.
Line 51, "formed" should read -- formed by the --.

Column 7,
Line 3, "embodiment" should read -- embodiments --.

Signed and Sealed this

Eighteenth Day of November, 2003

JAMES E. ROGAN
*Director of the United States Patent and Trademark Office*